United States Patent [19]

Mino et al.

[11] Patent Number: 5,246,740
[45] Date of Patent: Sep. 21, 1993

[54] PROCESS FOR PREPARING A LAMINATION OF ORGANIC MONOMOLECULAR FILMS, AND A CHEMICAL ADSORBENT USED FOR THE PROCESS

[75] Inventors: Norihisa Mino, Settsu; Kazufumi Ogawa, Hirakata; Yoshikazu Yamagata, Moriguchi, Japan

[73] Assignee: Matsushita Electric Industrial Co., Ltd., Osaka, Japan

[21] Appl. No.: 639,640

[22] Filed: Jan. 10, 1991

[30] Foreign Application Priority Data

Jan. 12, 1990 [JP] Japan .................................... 2-4982
Sep. 17, 1990 [JP] Japan .................................. 2-248182

[51] Int. Cl.$^5$ ............................................. B05D 3/10
[52] U.S. Cl. ................................... 427/437; 427/387; 427/2; 427/407.1; 556/431
[58] Field of Search ................ 427/443.1, 337, 407.1, 427/2, 387; 556/431

[56] References Cited

U.S. PATENT DOCUMENTS

| | | | |
|---|---|---|---|
| 4,539,061 | 9/1985 | Sagiv | 427/207.1 |
| 4,761,316 | 8/1988 | Ogawa | 427/131 |
| 4,921,989 | 5/1990 | Ishihara et al. | 556/431 |
| 5,008,127 | 4/1991 | Ogawa | 427/36 |
| 5,057,339 | 10/1991 | Ogawa | 427/340 |

FOREIGN PATENT DOCUMENTS 0077135 4/1983 European Pat. Off. .
0123435 10/1984 European Pat. Off. .
0160426 11/1985 European Pat. Off. .

*Primary Examiner*—Shrive Beck
*Assistant Examiner*—Diana Dudash
*Attorney, Agent, or Firm*—Panitch Schwarze Jacobs & Nadel

[57] ABSTRACT

According to the present invention, a lamination of organic monomolecular films is formed by a chemical adsorption technique. The representative example of the chemical adsorbent used in this invention is a hydrocarbon having trichlorosilyl group at one molecular end, and dialkylsilyl group at the other end. This chemical adsorbent binds to a base plate through siloxane linkage to form a first monomolecular film. It also binds to the first monomolecular film through siloxane linkage to form a second monomolecular film. As a result, a lamination of organic monomolecular films with desirable properties can be formed.

10 Claims, 10 Drawing Sheets

PROCESS FOR PREPARING A LAMINATION OF ORGANIC MONOMOLECULAR FILMS, AND A CHEMICAL ADSORBENT USED FOR THE PROCESS

BACKGROUND OF THE INVENTION

1. Field of the invention:

The present invention relates to a process for preparing organic monomolecular films, particularly to a process for the lamination of organic monomolecular films having two or more organic monomolecular film layers. Also, the present invention relates to a chemical adsorbent used for this process.

2. Description of the prior art:

An organic monomolecular film has been utilized in various devices for the purpose of protecting their surface, providing them with excellent lubricant properties or water repellent properties. Also, it is used as a film having a molecular orientation used in liquid crystals. For the formation of the organic monomolecular film, the Langmuir-Blodgett (LB) technique is well known. According to the LB technique, the organic monomolecular film can be formed as follows. First, straight chain hydrocarbon molecules having a hydrophilic group at one molecular end and a hydrophobic group at the other end spread on the surface of the water. The hydrophilic groups direct toward the depth of the water, whereas the hydrophobic groups direct toward the surface of the water. Next, when the whole area of the hydrocarbon molecules are narrowed with a barrier, the area per one hydrocarbon molecule becomes smaller. The hydrocarbon molecule chains are then packed closely together to form a monomolecular film with each molecular chain being directed at a right angle to the surface of the water. The resulting monomolecular film is attached to the surface of a base plate to form a monomolecular film layer. Also, the lamination of monomolecular films can be formed by laminating one or more monomolecular films on the base plate.

The monomolecular film formed by the LB technique mentioned above is attached to the base plate by van der Waals force, or ionic bonding strength. Also, when a lamination of monomolecular films having two or more layers is formed, monomolecular films are bound together by van der Waals force, or ionic bonding strength. However, the binding energy of these bindings between the base plate and the monomolecular film, or between each monomolecular films is so low that the monomolecular film or the lamination cannot be attached to the base plate tightly. Therefore, the monomolecular film or the lamination is susceptible to peeling or dissolving into solvent when the base plate is processed.

To solve these problems, a chemical adsorption technique has been proposed for preparing a monomolecular film. In this technique, a straight chain hydrocarbon having chlorosilane group at one molecular end is used as a chemical adsorbent. When the chemical adsorbent is applied to the surface of a base plate having a hydroxyl group, the chlorosilane group reacts with the hydroxyl group for the elimination of hydrogen chloride. Thus, the chemical adsorbent is bound chemically to the base plate through —Si—O— bond to form a monomolecular film on the base plate. Because the monomolecular film formed by this technique is bound chemically to the base plate, it will not peel even though the base plate is processed.

However, only a few technques are known for the formation of two or more monomolecular film layers which do not readily peel. The following illustrates one of the chemical adsorption techniques for laminating two monomolecular films. A first monomolecular film is formed on a base plate by using a hydrocarbon molecule having a double bond at the molecular end. The monomolecular film is then irradiated with an electron beam. The irradiation of electron beam under $N_2$ or $O_2$ atmosphere changes the double bond to —$NH_2$ group or —OH group, respectively. Next, a straight chain hydrocarbon having chlorosilane group such as —$SiCl_3$ is applied to the irradiated monomolecular film. The straight chain hydrocarbon molecule is bound to the hydrocarbon molecule of the first monomolecular film by the reaction of the chlorosilane group with —$NH_2$ or —OH group, and therefore a lamination of monomolecular films having two monomolecular film layers can be formed. However, because the irradiation of electron beams may cause side reactions such as crosslinking reaction between each hydrocarbon molecules of the first monomolecular film formed on the base plate, a lamination of monomolecular films with desirable properties cannot be obtained by this technique.

A lamination of monomolecular films is also formed by the following chemical adsorption technique. A first monomolecular film is formed on a base plate by the same procedure as described above using hydrocarbon molecules, and then the first monomolecular film reacts with diborane instead of irradiating with an electron beam. The double bond present in the first monomolecular film is converted into a hydroxyl group by the reaction of diborane. Then, by the same procedure as described above, the hydroxyl group reacts with the chlorosilane group of another hydrocarbon molecule to form a lamination of monomolecular films. However, because diborane reacts explosively when it comes into contact with wet air, it is difficult to handle diborane, and dangerous to carry out this technique.

SUMMARY OF THE INVENTION

The first process for preparing the lamination of organic monomolecular films of this invention, which overcomes the above-discussed and numerous other disadvantages and deficiencies of the prior art, comprises:

forming a first monomolecular film on a base plate by using a hydrocarbon having a group represented by the following formula I at one molecular end, and a group represented by the following formula II at the other end:

$$—Si—Cl_{n^1}X^1{}_{3-n^1} \qquad (I)$$

wherein $X^1$ is each independently, H, a lower alkyl group having 1 to 4 carbon atoms, an alkoxy group having 1 to 4 carbon atoms, a hydrocarbon group with unsaturated bonds having 2 to 30 carbon atoms, or a group represented by the following formula V, and $n^1$ is 1,2 or 3,

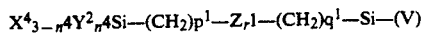

$$X^4{}_{3-n^4}Y^2{}_{n^4}Si—(CH_2)_{p^1}—Z_{r^1}—(CH_2)_{q^1}—Si—(V)$$

wherein $X^4$ is a lower alkyl group having 1 to 4 carbon atoms, $Y^2$ is, each independenly, H, halogen, phenyl, —NR$^3_2$, or —OR$^3$, R$^3$ is a lower alkyl group having 1 to 4 carbon atoms, Z$_r$1 is a single bond or a group selected from the group consisting of:

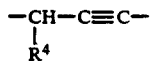

(R$^4$ is a lower alkyl group having 1 to 4 carbon atoms), —C≡C—C≡C—.

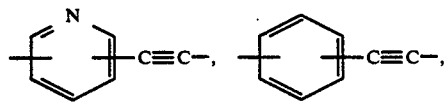

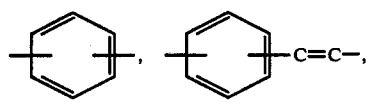

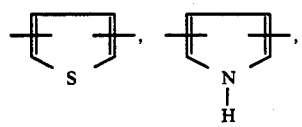

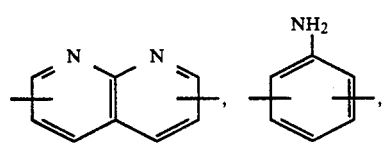

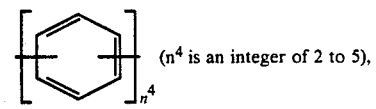

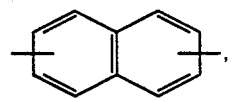 (n$^4$ is an integer of 2 to 5),

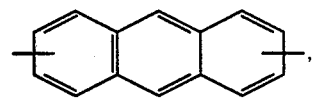

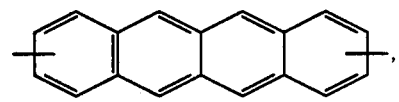

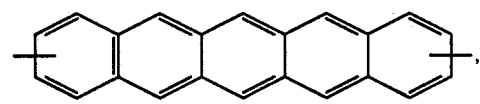

and

p$^1$ and q$^1$ are, each independently, zero or an integer, and p plus q is 1 to 30, and r$^1$ is an integer of zero to 5, $$-Si-X^2{}_{3-n2}Y^1{}_{n2} \quad (II)$$

wherein X$^2$ is a lower alkyl group having 1 to 4 carbon atoms, Y$^1$ is, each independently, H, halogen, phenyl, —NR$^1_2$, or —OR$^1$, R$^1$ is a lower alkyl group having 1 to 4 carbon atoms, and n$^2$ is 1 or 2;

converting the group represented by formula II into a —OH group by oxidizing said first monomolecular film with hydrogen peroxide; and forming a second monomolecular film on the surface of said oxidized first monomolecular film by using a hydrocarbon, wherein said hydrocarbon has a group represented by said formula I at one molecular end, and a group represented by said formula II at the other end.

In a preferred embodiment, the group represented by said formula II is at least one selected from the group consisting of —Si(CH$_3$)$_2$H, —Si(CH$_3$)$_2$F, —Si(CH$_3$)F$_2$, —Si(CH$_3$)$_2$Cl, —Si(CH$_3$)Cl$_2$, —Si(CH$_3$)$_2$NR$^1_2$, —Si(CH$_3$)$_2$OR$^1$, —Si(CH$_3$)(OR$^1$)$_2$, and —Si(CH$_3$)$_2$C$_6$H$_5$.

In a preferred embodiment, the step for forming said first monomolecular film is carried out by a chemical adsorption technique.

In a preferred embodiment, the step for forming said second monomolecular film is carried out by a chemical adsorption technique.

In a preferred embodiment, the surface of said base plate has hydroxyl groups, amino groups, or carboxyl groups.

The second process for preparing a lamination of organic monomolecular films of this invention comprises:

forming a first monomolecular film on a base plate by using a hydrocarbon having a group represented by the following formula I at one molecular end, and a group represented by the following formula III at the other end:

wherein X$^1$ is each independently, H, a lower alkyl group having 1 to 4 carbon atoms, an alkoxy group having 1 to 4 carbon atoms, a hydrocarbon group with unsaturated bonds having 2 to 30 carbon atoms, or a group represented by the following formula V, and n$^1$ is 1, 2 or 3,

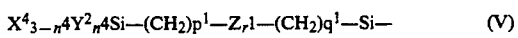

wherein X$^4$ is a lower alkyl group having 1 to 4 carbon atoms, Y$^2$ is, each independently, H, halogen, phenyl, —NR$^3_2$, or —OR$^3$, R$^3$ is a lower alkyl group having 1 to 4 carbon atoms, Z$_r$1 is a single bond or a group selected from the group consisting of:

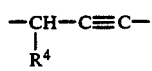

(R$^4$ is a lower alkyl group having 1 to 4 carbon atoms), —C≡C—C≡C—,

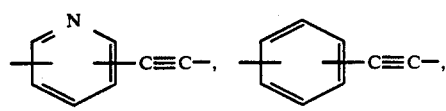

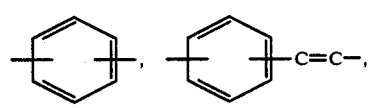

-continued

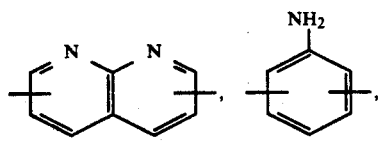

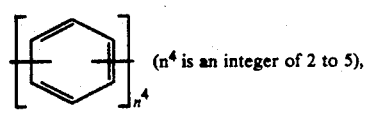 ($n^4$ is an integer of 2 to 5),

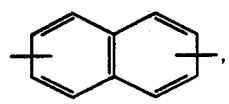,

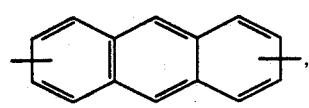,

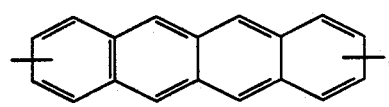, and

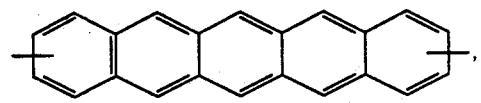, $p^1$ and $q^1$ are, each independently, zero or an integer, and p plus q is 1 to 30, and $r^1$ is an integer of zero to 5, $$-SiX^3{}_2H \qquad (III)$$

wherein $X^3$ is a lower alkyl group having 1 to 4 carbon atoms, converting the H in the group represented by formula III into an —OH group by treating said first monomolecular film with an alkali; and forming a second monomolecular film on the surface of said alkali-treated first monomolecular film by using a hydrocarbon, wherein said hydrocarbon has a group represented by said formula I at one molecular end, and a group represented by said formula III at the other end.

In a preferred embodiment, the step for forming said first monomolecular film of the second process is carried out by a chemical adsorption technique.

In a preferred embodiment, the step for forming said second monomolecular film of the second process is carried out by a chemical adsorption technique.

In a preferred embodiment, the surface of said base plate used for the second process has hydroxyl groups, amino groups, or carboxyl groups.

A chemical adsorbent used for preparing a lamination of organic monomolecular films of this invention is represented by the following formula IV:

$$X^2{}_{3-n}2Y^1{}_{n}2Si-(CH_2)_p-Z_r-(CH_2)_q-SiCl_{n^1}X^1{}_{3-n^1} \qquad (IV)$$

wherein $X^1$ is each independently, H, a lower alkyl group having 1 to 4 carbon atoms, or an alkoxy group having 1 to 4 carbon atoms, $X^2$ is a lower alkyl group having 1 to 4 carbon atoms, $Y^1$ is, each independently, H, halogen, phenyl, $-NR^1{}_2$, or $-OR^1$, $R^1$ is a lower alkyl group having 1 to 4 carbon atoms, $Z_r$ is a single bond or a group selected from the group consisting of:

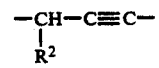

($R^2$ is a lower alkyl group having 1 to 4 carbon atoms),
—C≡C—C≡C—,

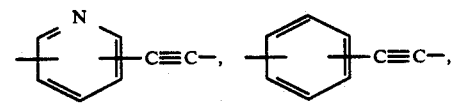

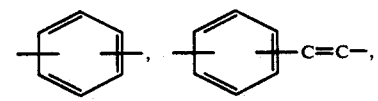

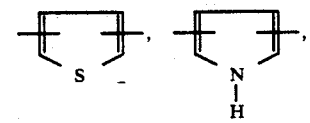

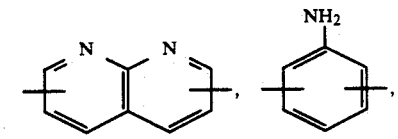

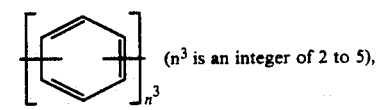 ($n^3$ is an integer of 2 to 5),

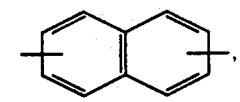,

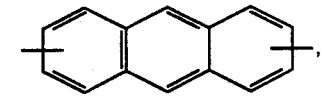,

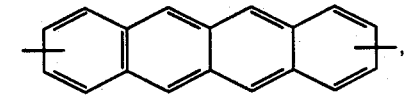, and

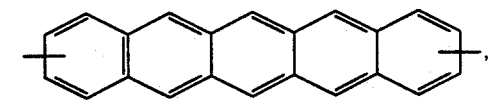, $n^1$ and $n^2$ are, each independently, 1, 2, or 3, p and q are, each independently, zero or an integer, and p plus q is 1 to 30, and r is an integer of zero to 5.

Thus, the invention described herein makes possible the objectives of:

(1) providing a process for preparing a lamination of organic monomolecular films with excellent adhesiveness to a base plate, and between each monomolecular film;

(2) providing a process for preparing a lamination of organic monomolecular films without causing any side reactions.

(3) providing a simple process for preparing a lamination of organic monomolecular films without using any dangerous reagent; and (4) providing a chemical adsorbent for the formation of a lamination of organic monomolecular films in the aforementioned processes.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

The chemical adsorbent, which is used in the process for preparing a lamination of organic monomolecular films of this invention, is a hydrocarbon represented by the following formula IV:

$$X^2{}_{3-n^2}Y^1{}_{n^2}Si\text{---}(CH_2)_p\text{---}Z_r\text{---}(CH_2{})_q\text{---}SiCl_{n^1}X^1{}_{3-n^1} \quad (IV)$$

wherein $X^1$ is each independently, H, a lower alkyl group having 1 to 4 carbon atoms, or an alkoxy group having 1 to 4 carbon atoms, $X^2$ is a lower alkyl group having 1 to 4 carbon atoms, $Y^1$ is, each independently, H, halogen, phenyl, $-NR^1{}_2$, or $-OR^1$, $R^1$ is a lower alkyl group having 1 to 4 carbon atoms, $Z_r$ is a single bond or a group selected from the group consisting of:

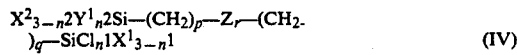

($R^2$ is a lower alkyl group having 1 to 4 carbon atoms),
—C≡C—C≡C—,

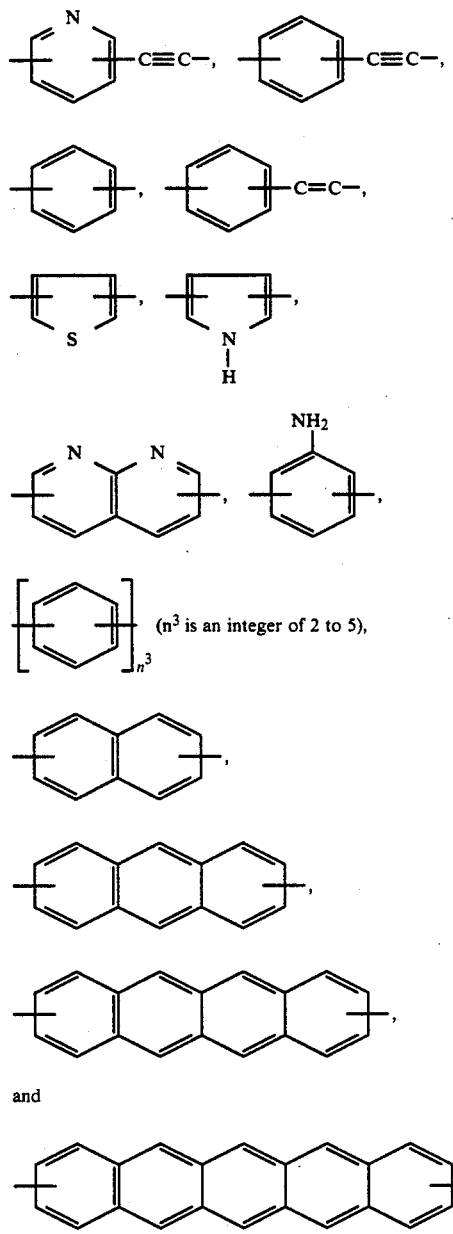

and $n^1$ and $n^2$ are, each independently, 1, 2, or 3, p and q are, each independently, zero or an integer, and p plus q is 1 to 30, and r is an integer of zero to 5. Each aromatic ring in the above formulae can contain one or more substituents.

Among the hydrocarbon used for the chemical absorbent, a straight chain hydrocarbon is preferred for the purpose of preparing a monomolecular film with high molecular density.

In the first process for preparing a lamination of organic monomolecular films of this invention, a hydrocarbon having the groups represented by the following formulae I and II at each molecular end is particularly used:

wherein $X^1$ is each independently, H, a lower alkyl group having 1 to 4 carbon atoms, an alkoxy group having 1 to 4 carbon atoms, a hydrocarbon group with unsaturated bonds having 2 to 30 carbon atoms, or a group represented by the following formula V, and $n^1$ is 1, 2 or 3, $$X^4{}_{3-n^4}Y^2{}_{n^4}Si\text{—}(CH_2)p^1\text{—}Z_r1\text{—}(CH_2)q^1\text{—}Si\text{—} \quad (V)$$

wherein $X^4$ is a lower alkyl group having 1 to 4 carbon atoms, $Y^2$ is, each independently, H, halogen, phenyl, $-NR^3{}_2$, or $-OR^3$, $R^3$ is a lower alkyl group having 1 to 4 carbon atoms, $Z_r1$ is a single bond or a group selected from the group consisting of:

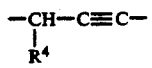

($R^4$ is a lower alkyl group having 1 to 4 carbon atoms), $-C\equiv C-C\equiv C-$,

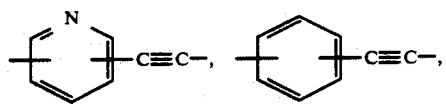

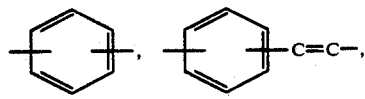

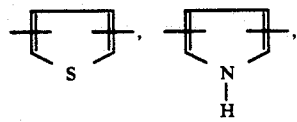

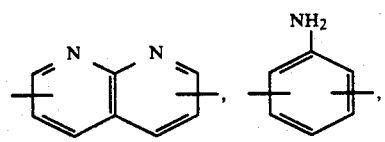

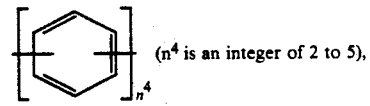

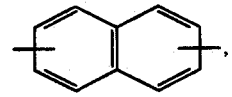

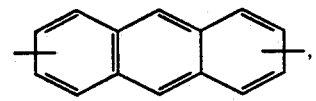

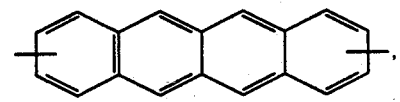

and

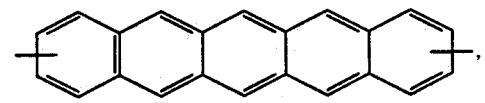

$p^1$ and $q^1$ are, each independently, zero or an integer, and p plus q is 1 to 30, and $r^1$ is an integer of zero to 5, $$-Si-X^2{}_{3-n^2}Y^1{}_{n^2} \quad (II)$$

wherein $X^2$ is a lower alkyl group having 1 to 4 carbon atoms, $Y^1$ is, each independently, H, halogen, phenyl, $-NR^1{}_2$, or $-OR^1$, $R^1$ is a lower alkyl group having 1 to 4 carbon atoms, and $n^2$ is 1 or 2.

Figure 1:
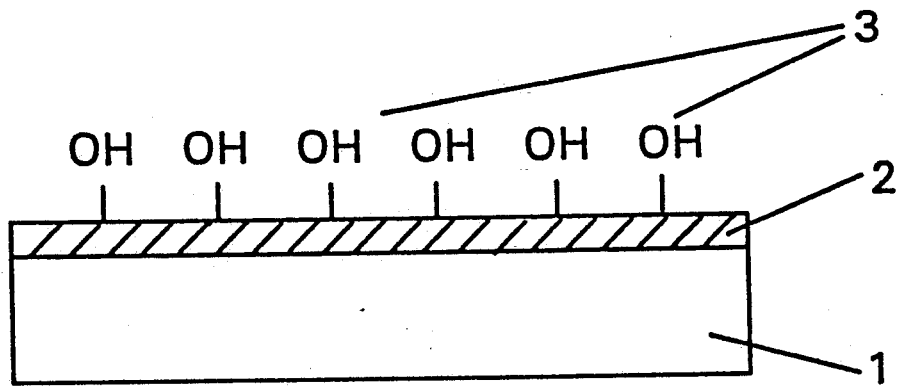
FIGS. 1, 2, 3, 4, 5, 6 and 7 show the steps for preparing a lamination of organic monomolecular films according to the first process of this invention.
Figure 2:
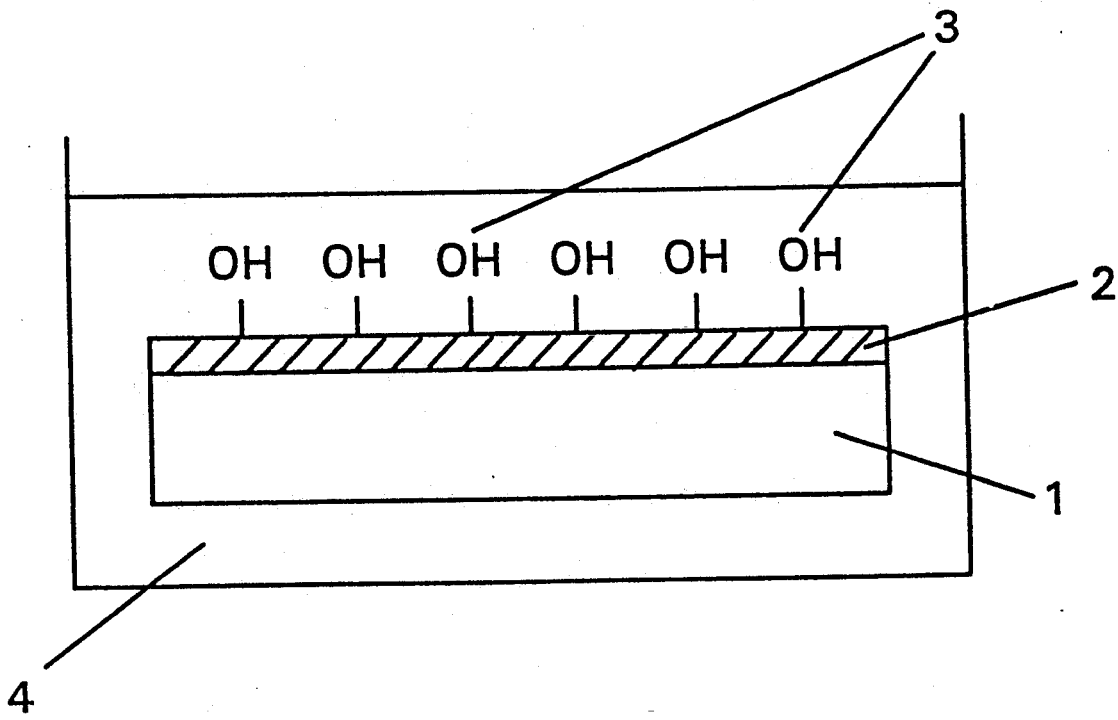
Figure 3:
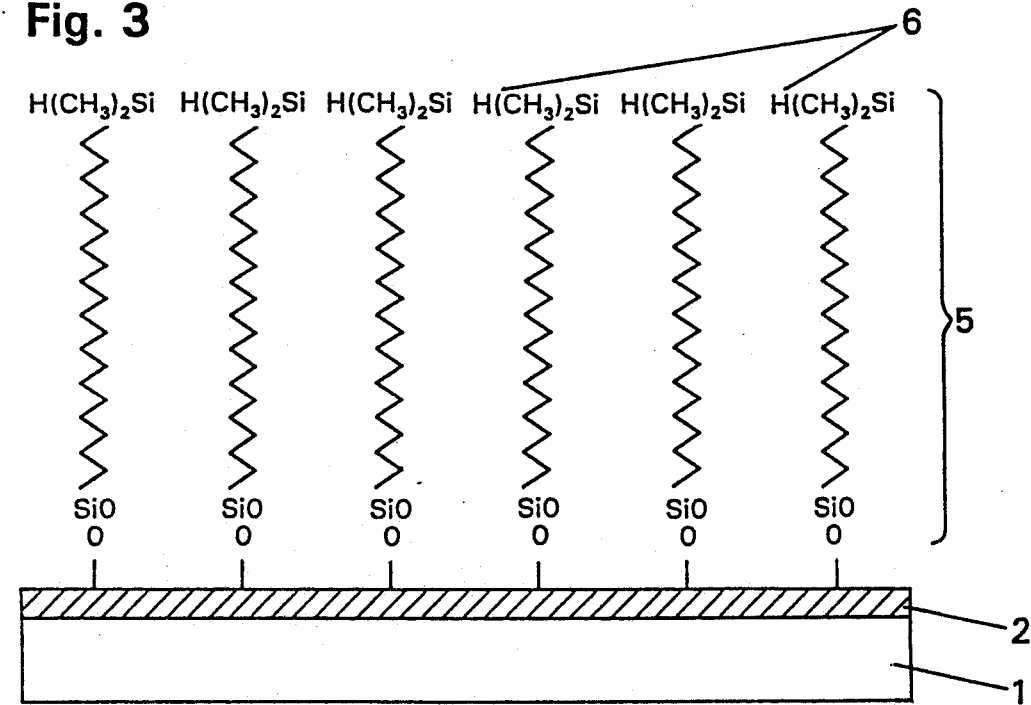

In order to prepare a lamination of organic monomolecular films by the first process of this invention, a base plate having functional groups such as hydroxyl groups, amino groups, carboxyl groups, or the like on its surface is first provided. For example, a silicon base plate having an oxidation film formed on its surface, shown in FIG. 1, is preferably used. The oxidation film is formed by the treatment of the base plate with an oxidizing agent, or formed by autogenous oxidation. Next, as shown in FIG. 2, the base plate is immersed in a solution of a chemical adsorbent in an organic solvent. The organic solvent which can be used includes n-hexane, carbon tetrachloride, and the like, and mixtures thereof. The concentration of the chemical adsorbent may be varied depending on the kinds of the base plate and its surface area, and is usually from 1 mmole/l to 100 mmole/l. By this immersion procedure, the group of formula I that is present in the chemical adsorbent reacts with —OH group that is present on the base plate, so that the chemical adsorbent can be bound chemically to the surface of the base plate. When the chemical adsorbent having $-SiCl_3$ as the group of formula I, and $-Si(CH_3)_2H$ as the group of formula II is used, the first monomolecular film shown in FIG. 3 is formed by the immersion procedure described above.

Figure 7:
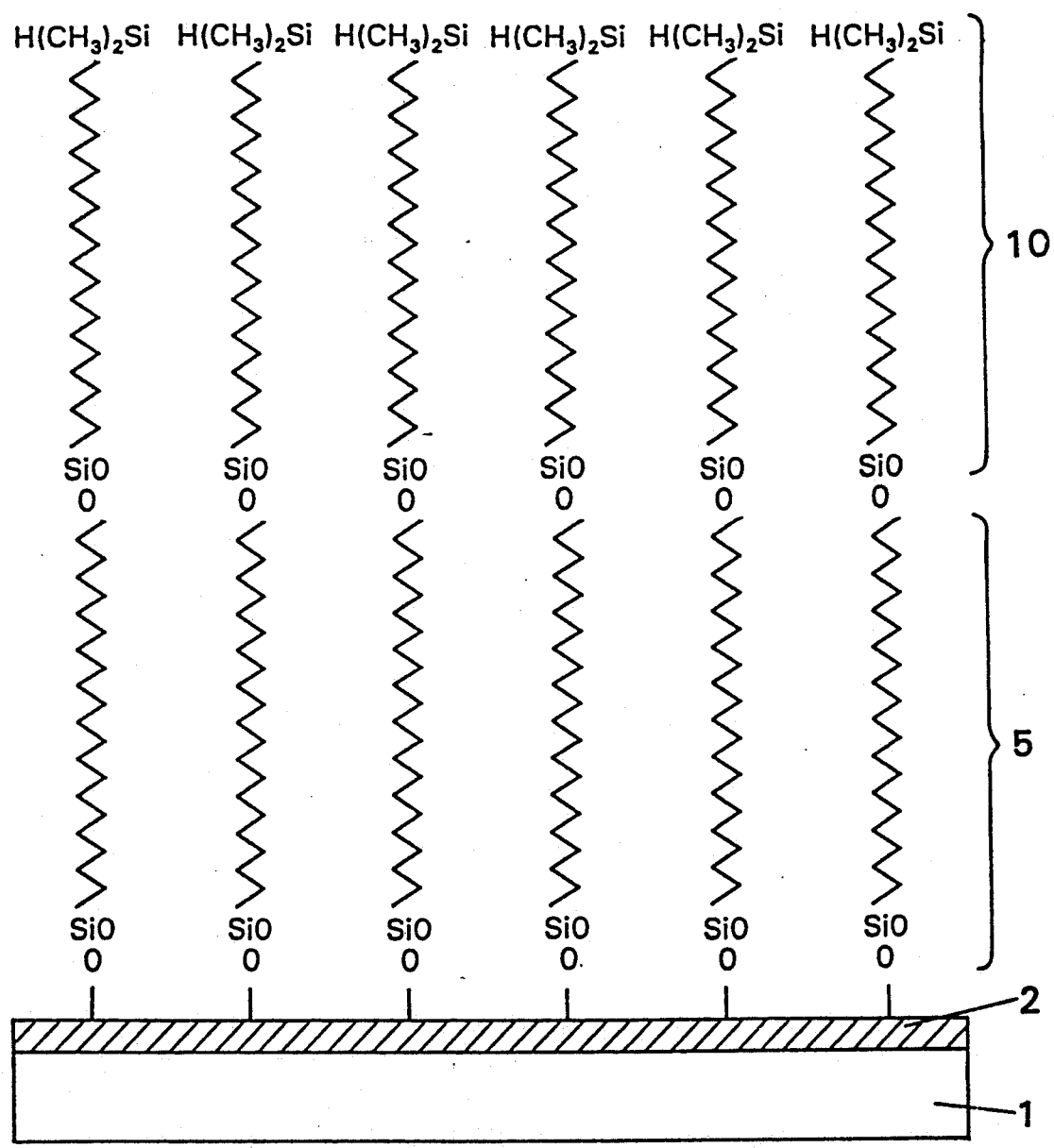

Subsequently, when the base plate having the first monomolecular film is immersed in a solution containing a major amount of hydrogen peroxide, an —OH group is formed at the end of the hydrocarbon by the elimination of the group represented by formula II (in this case, the dimethylsilyl group). Then, the base plate is immersed in a chemical adsorbent solution as described above. The chemical adsorbent contained in the solution can be the same as or different from the chemical adsorbent used for forming the first monomolecular film. When the same kind of chemical adsorbent is used, the —OH group of the first monomolecular film reacts with the $-SiCl_3$ group that is present at the end of the hydrocarbon to form a second monomolecular film as shown in FIG. 7.

A third monomolecular film can be formed on the second monomolecular film by the processes as mentioned above. Thus, a lamination of maltilayer monomolecular films can be obtained.

In the second process for preparing a lamination of organic monomolecular films of this invention, a hydrocarbon having a group represented by formula I described above at one molecular end, and a group represented by the following formula III at the other end is particularly used:

$$-SiX^3{}_2H \quad (III)$$

wherein $X^3$ is a lower alkyl group having 1 to 4 carbon atoms.

Figure 9:
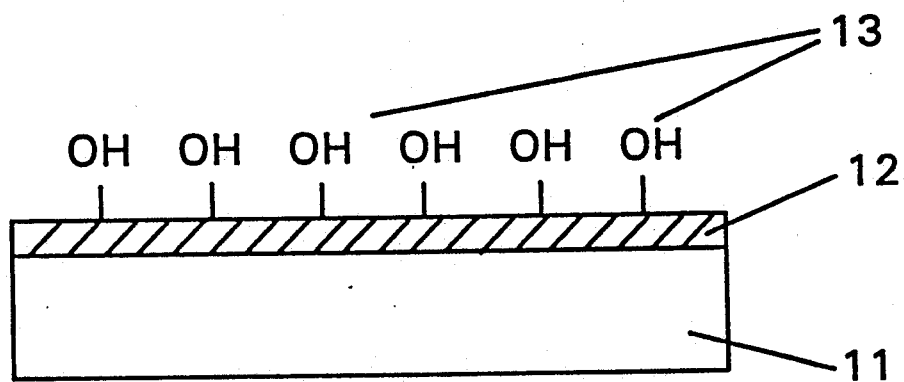
FIGS. 9, 10, 11, 12, 13, 14 and 15 show the steps for preparing a lamination of organic monomolecular films according to the second process of this invention.
Figure 10:
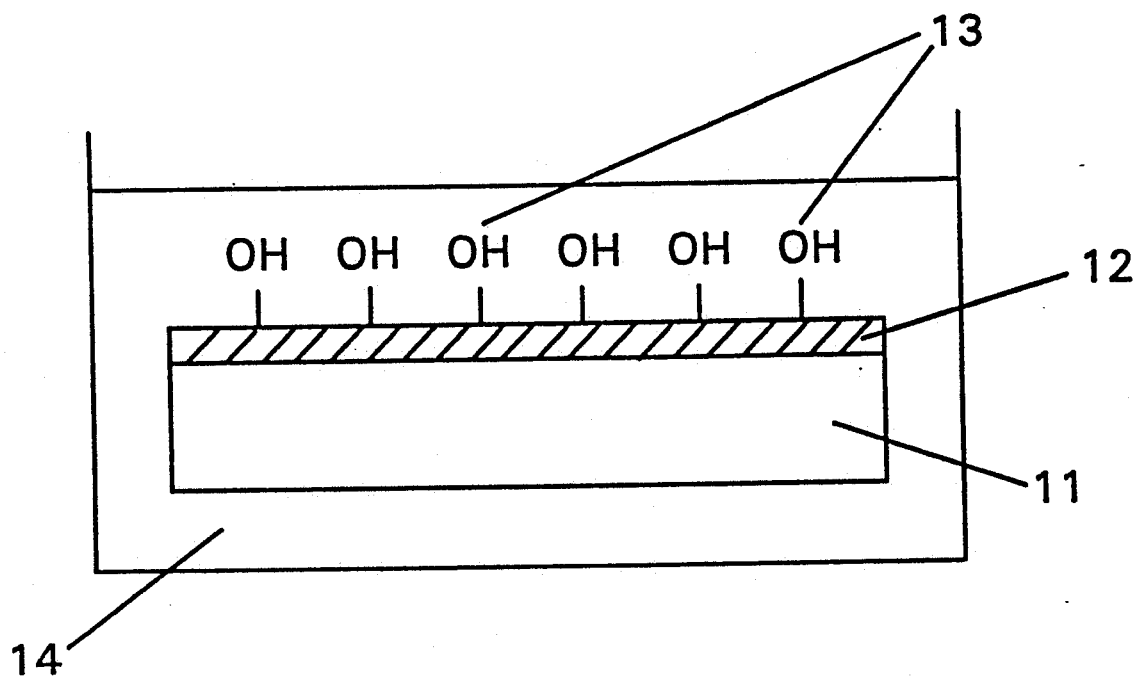
Figure 11:
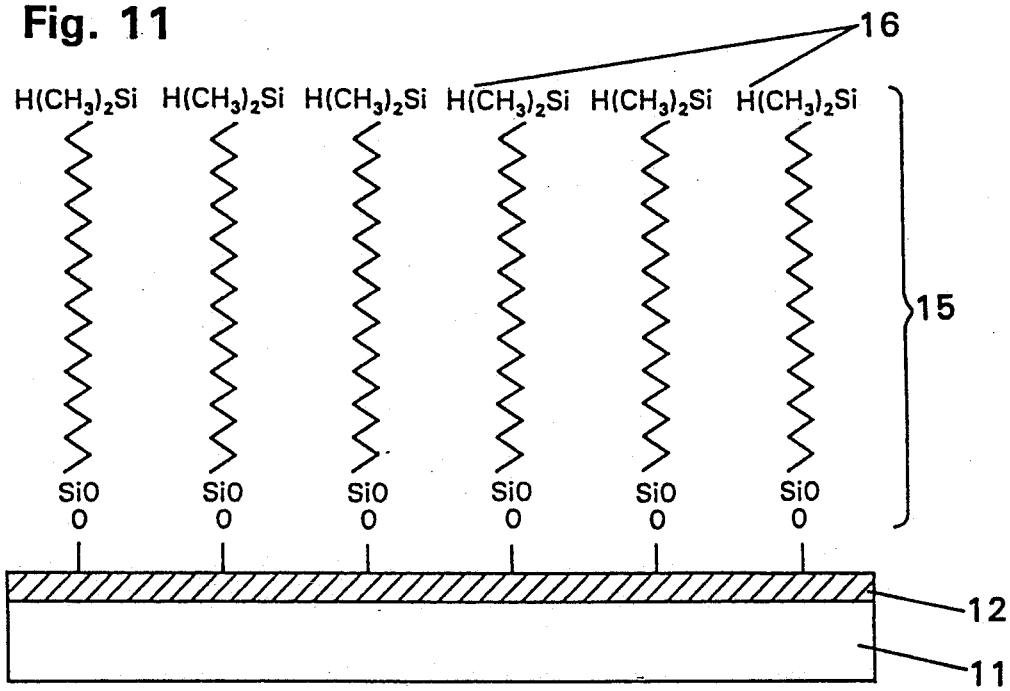

In order to prepare the lamination of organic monomolecular films by the second process of this invention, a base plate having functional groups such as hydroxyl groups, amino groups, carboxyl groups, or the like is provided by the same procedure as used in the first process mentioned above (see FIG. 9). Next, as shown in FIG. 10, the base plate is immersed in a solution of a chemical adsorbent in an organic solvent. The same kinds of organic solvents, and the same concentration range of the chemical adsorbent can be used as in the first process. By this immersion procedure, the group of formula I that is present in the chemical adsorbent is reacted with the —OH group that is present on the base plate, so that the chemical adsorbent is bound chemically to the surface of the base plate. When the chemical adsorbent having —SiCl$_3$ as the group of formula I, and —Si(CH$_3$)$_2$H as the group of formula II is used, the first monomolecular film shown in FIG. 11 is formed by the immersion procedure described above.

Figure 12:
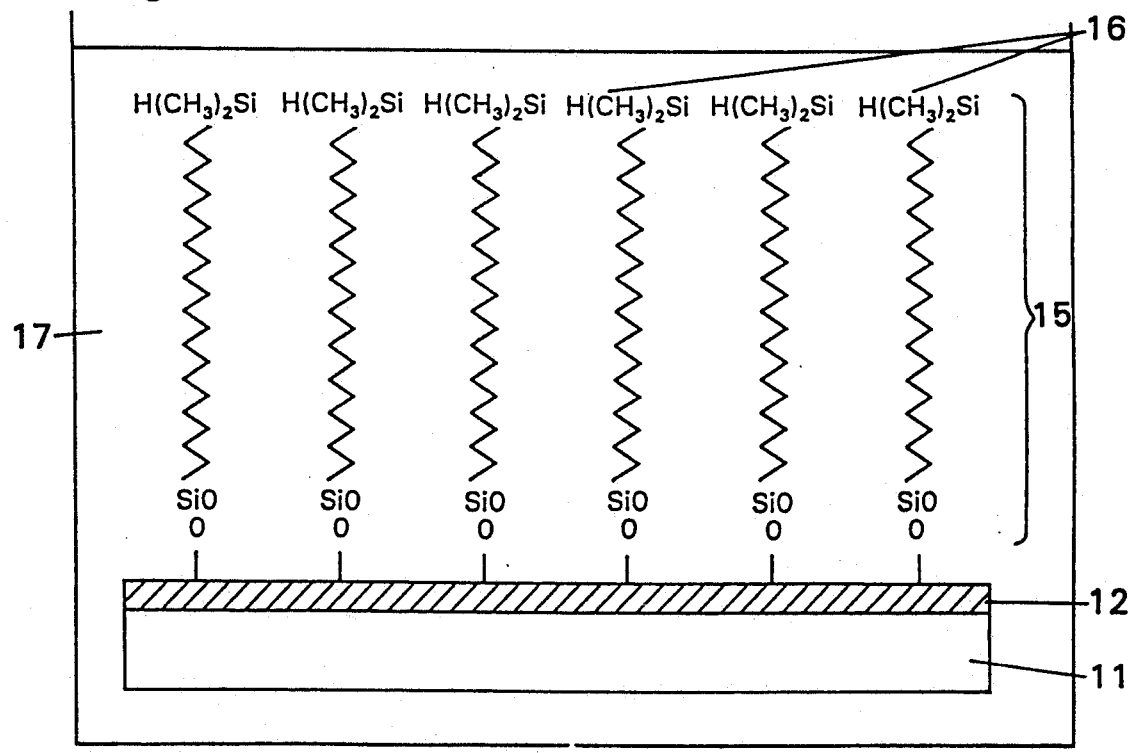
Figure 13:
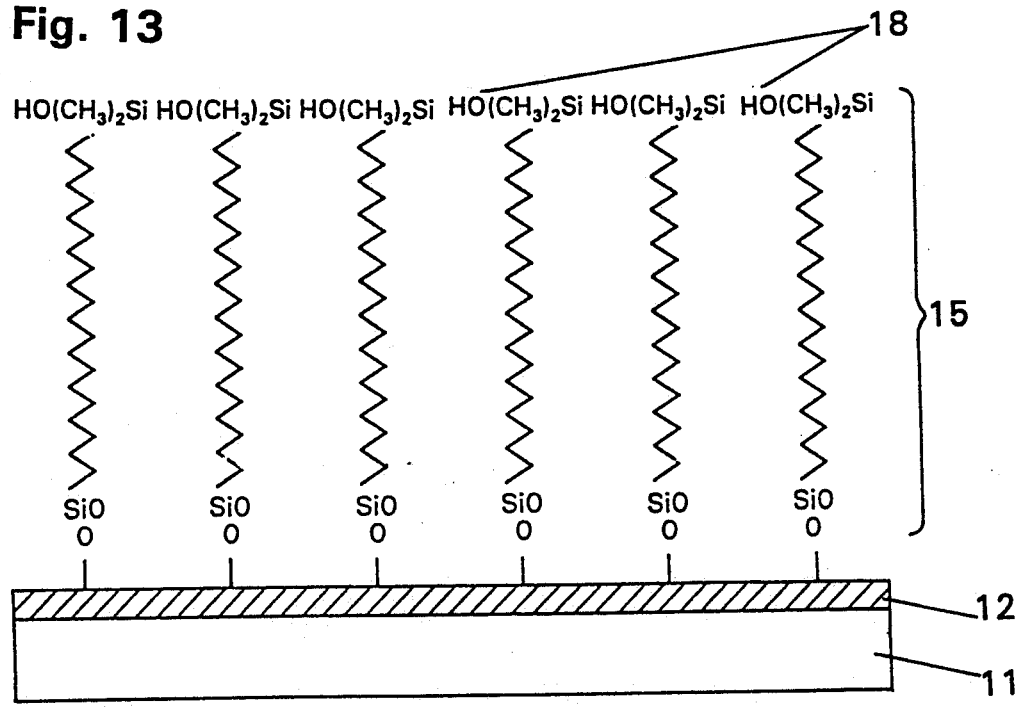
Figure 15:
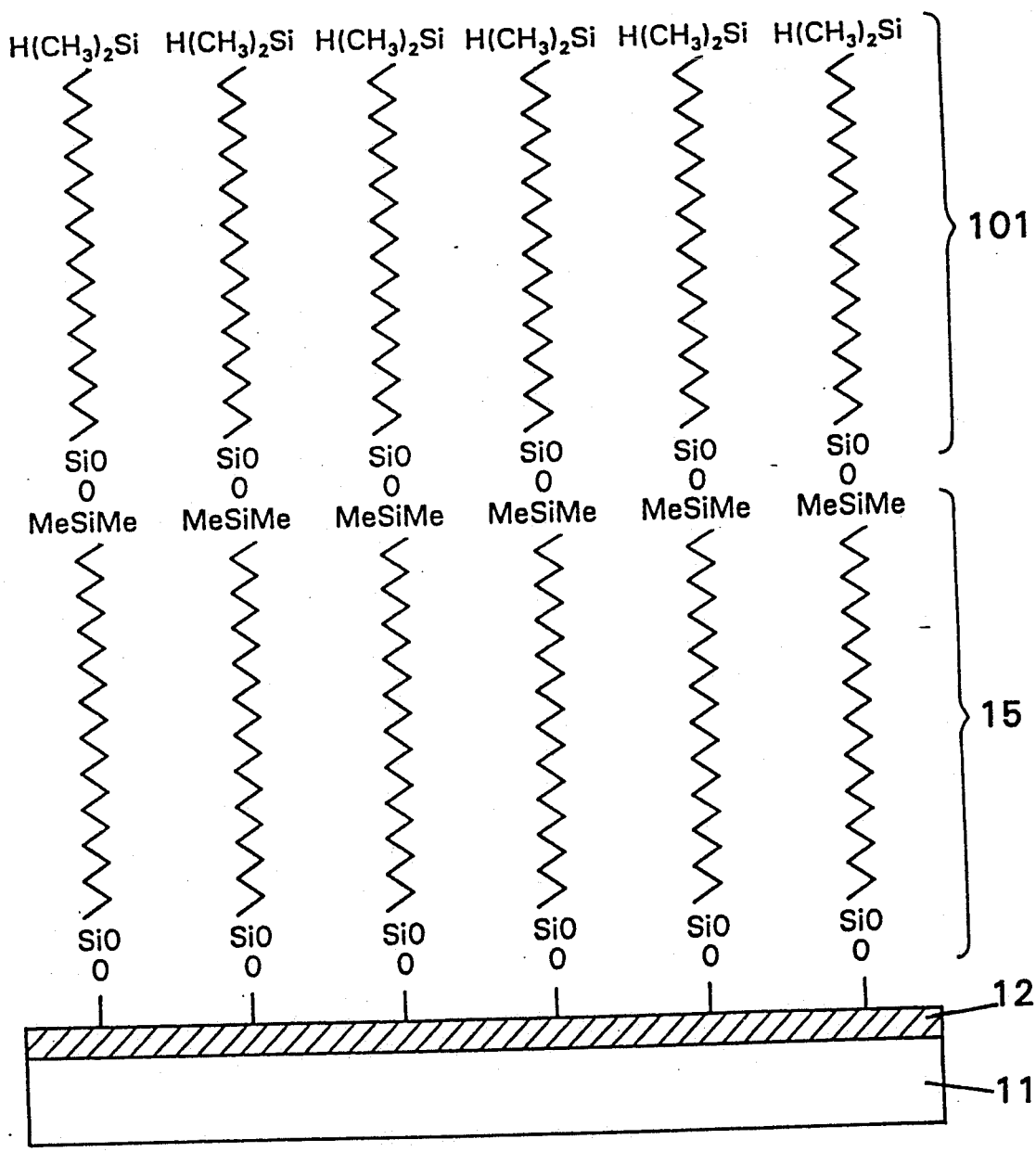

Subsequently, when the base plate having the first monomolecular film is immersed in an alkaline solution as shown in FIG. 12, the —OH group is formed at the end of the hydrocarbon by the cleavage of Si—H linkage in the —SiX$^3$$_2$H group represented by formula III (see FIG. 13). The alkalis which can be used include, for example, alkaline metal hydroxides and tetraammonium salts such as sodium hydroxide, potassium hydroxide, tetramethylammonium hydroxide, and the like. These alkalis are used in the form of an aqueous solution or a solution of alcohol-type solvents ranging in concentration of from 0.5 to 30 wt %. Then, the base plate is immersed in a chemical adsorbent solution as described above. the chemical adsorbent contained in the solution can be the same as or different from the chemical adsorbent used for forming the first monomolecular film. When the same kind of chemical adsorbent is used, the —OH group of the first monomolecular film is reacted with —SiCl$_3$ group that is present at the end of the hydrocarbon to form a second monomolecular film as shown in FIG. 15.

A third monomolecular film can be formed on the second monomolecular film by the processes as mentioned above. Thus, a lamination of maltilayer monmomolecular films can be obtained.

As is described above, the lamination of organic monomolecular films formed by the process of this invention has higher strength than those formed by the conventional LB technique, since the first monomolecular film is covalently bound to the base plate by siloxane linkage, and also first and second monomolecular films are bound to each other covalently by siloxane linkage. Therefore, the lamination of organic monomolecular films does not readily peel from the base plate. Also, because the lamination of monomolecular films is formed by chemical reactions at room temperature, its principal chemical structure is not changed due to side reactions such as crosslinking reaction, unlike the conventional electron irradiation techniques. Moreover, according to the process of this invention, the lamination of organic monomolecular films can be formed readily without using any dangerous reagent such as diborane.

Additionally, using a chemical adsorbent having a functional group Z$_r$ shown in the formula IV, a lamination of organic monomolecular films with desirable properties can be formed, depending on their practical uses. Group Z$_r$ includes one of the following group:

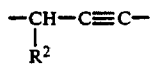

($R^2$ is a lower alkyl group having 1 to 4 carbon atoms), —C≡C—C≡C—,

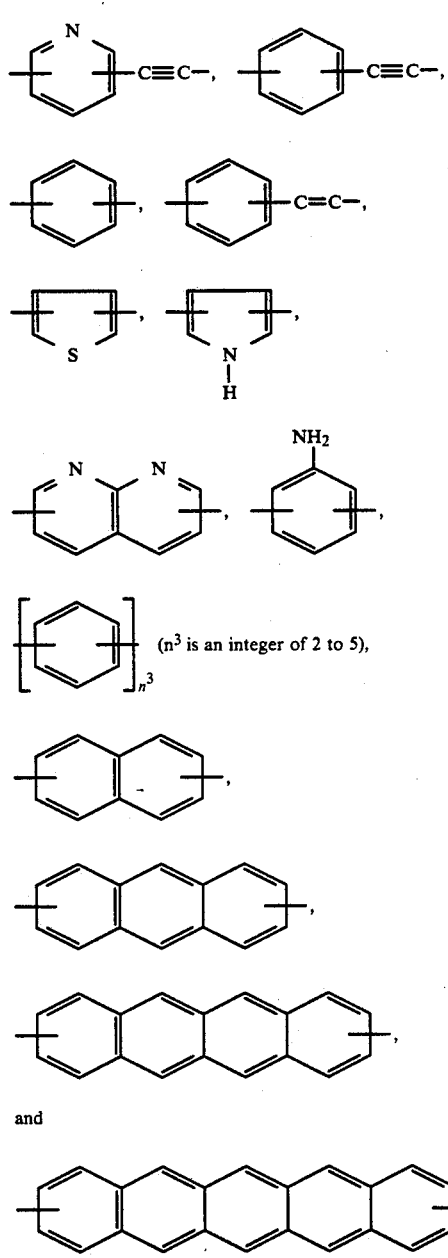

n$^1$ and n$^2$ are, each independently, 1, 2, or 3, p and q are, each independently, zero or an integer, and p plus q is 1 to 30, and r is an integer of zero to 5.

For example, when a chemical absorbent containing an acetylene group (—C≡C—) in the molecule is used, a lamination of organic monomolecular films which can be crosslinked is formed. When this lamination is irradiated for example, with X-ray beam or electron beam, the molecules of chemical absorbent are crosslinked with each other, resulting in a lamination having a waveguide of light at the crosslinked portions.

EXAMPLES

The following illustrates the examples of the first and second processes of this invention, referring to the figures.

Example 1

A silicon base plate (30×70 mm) is prepared, and its surface is oxidized to form an oxidation film 2 having 0.2 μm thickness. As shown in FIG. 1, a number of —OH groups 3 are present on the surface of the silicon base plate 1 having the oxidation film 2.

Figure 8A:
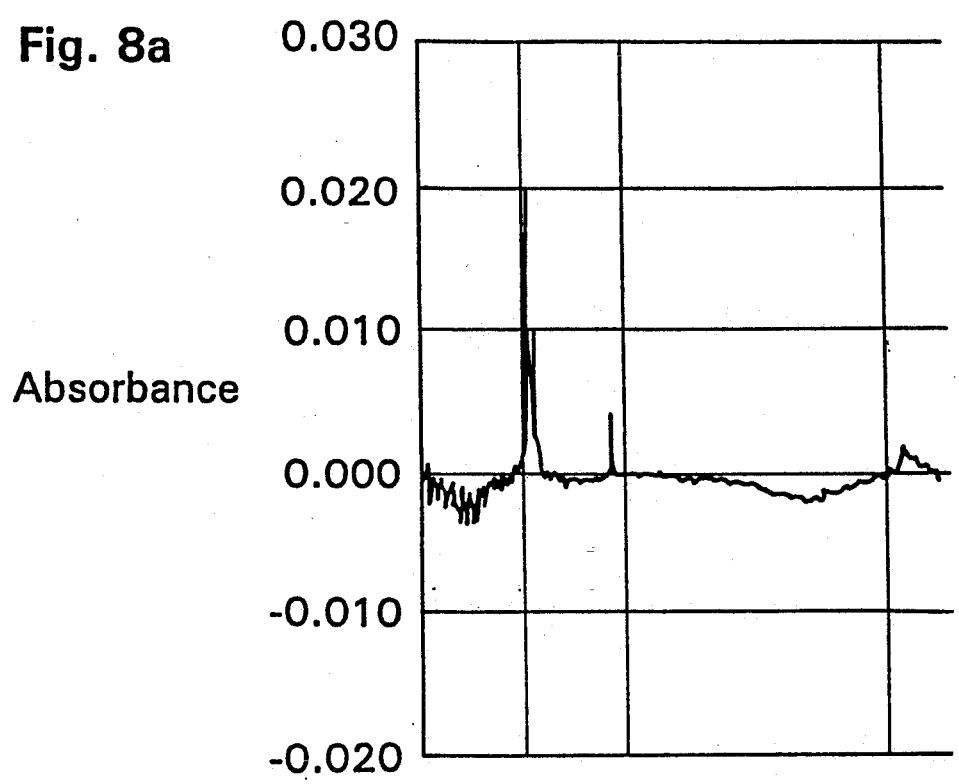
FIG. 8a shows the IR spectrum chart of a first monomolecular film which is formed according to the first process of this invention.

In this example, $H(CH_3)_2Si—(CH_2)_{18}—SiCl_3$ was used as a chemical absorbent. This chemical absorbent consists of a straight chain hydrocarbon having a dimethylsilyl group at one molecular end, and a trichlorosilyl group at the other end. The chemical absorbent is dissolved into a mixed solvent containing 80 wt % of n-hexadecane, 12 wt % of chloroform, and 8 wt % of carbon tetrachloride in a concentration of 10 mmol/l. The aforementioned silicon plate is immersed in 25 ml of this solution 4 at 30° C. for one hour (See, FIG. 2). The immersion procedure is carried out under dry nitrogen atmosphere. By this immersion procedure, as shown in FIG. 3, the trichlorosilyl group that is present at the end of the straight chain hydrocarbon reacts with —OH group that is present on the base plate, and the elimination of hydrogen chloride occurs. Thus, the chemical absorbent is bound covalently to the base plate by a —Si—O— linkage to form a first monomolecular film 5. On the surface of the first monomolecular film 5, dimethyl silyl groups forming ends of the hydrocarbon molecules are present on the same plane. FIG. 8a shows the infrared absorption (IR) spectrum chart of the first monomolecular film. In the spectrum chart, the absorptions at 2925 cm$^{-1}$ and 2850 cm$^{-1}$ originate from $CH_2$ anti-symmetric stretching vibration, and $CH_2$ symmetric stretching vibration, respectively.

Figure 4:
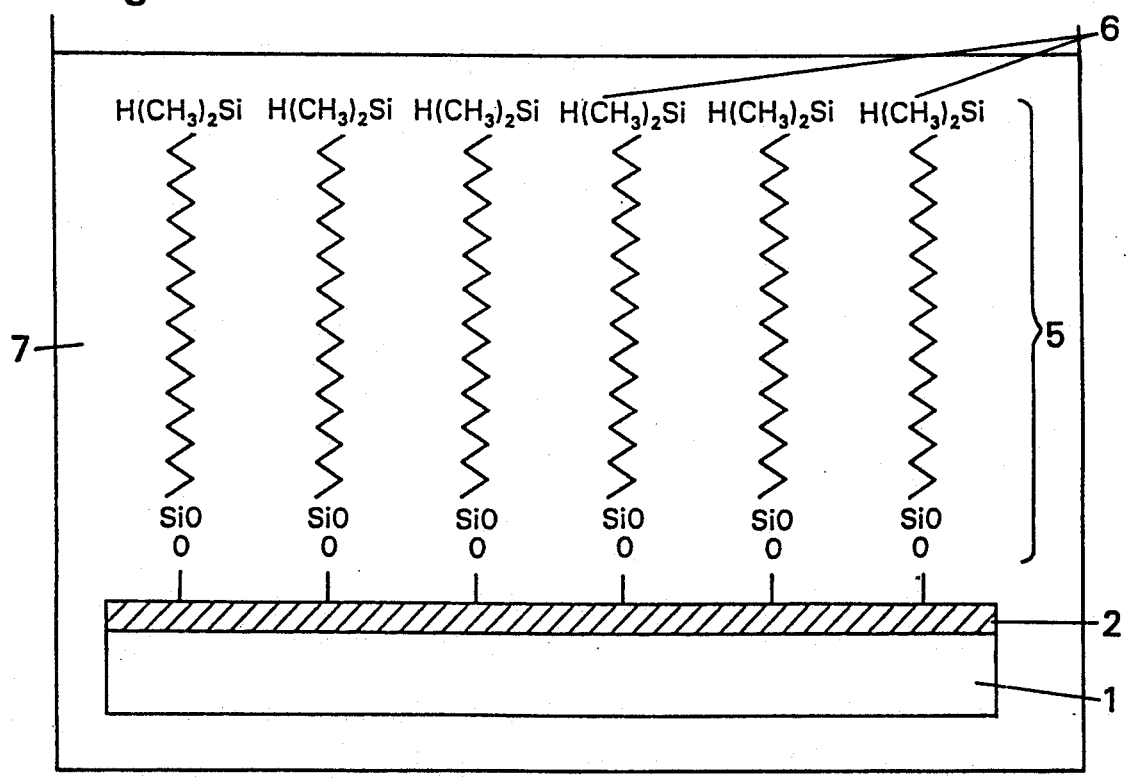
Figure 5:
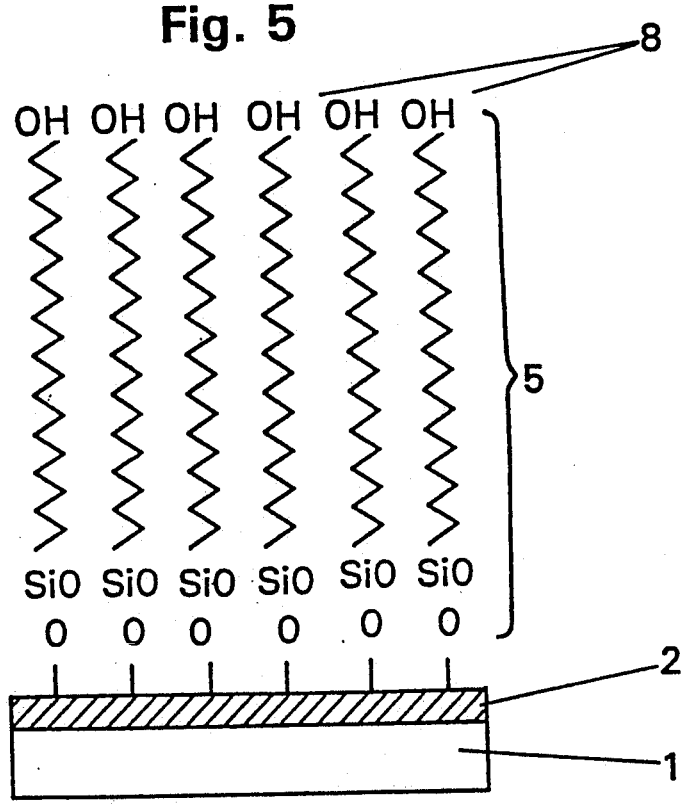

Next, an oxidation solution containing hydrogen peroxide is prepared by the following procedure. First, 146.9 mg of potassium fluoride is dissolved in 50 ml of methanol. Separately, 253.3 mg of potassium hydrogencarbonate is dissolved in 50 ml of tetrahydrofuran, and then 25 ml of 30% aqueous hydrogen peroxide is added, and stirred sufficiently at room temperature. These two solutions are mixed together to obtain an oxidation solution 7 containing hydrogen peroxide. The base plate having the first monomolecular film is immersed in the oxidation solution 7 at room temperature for 10 hours as shown in FIG. 4. As a result, the dimethylsilyl group that is present at the end of the hydrocarbon is cleaved to form —OH groups 8 (See, FIG. 5).

Figure 6:
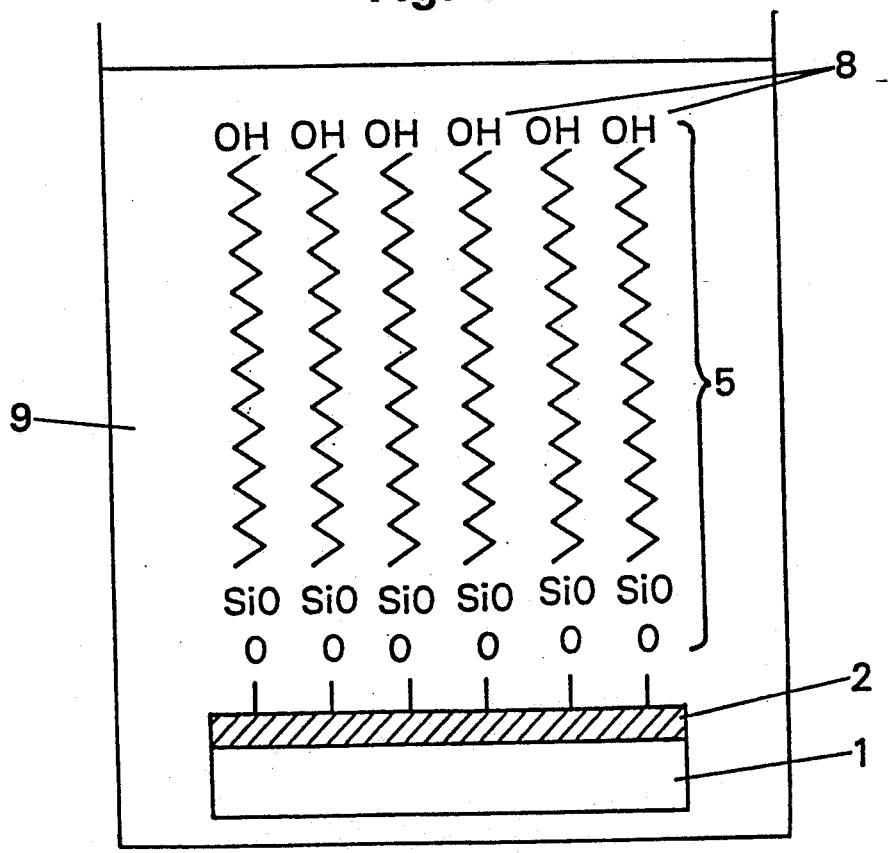

Then, the chemical adsorbent solution 9 is prepared as described above. The oxidized base plate having the first monomolecular film is immersed in the chemical adsorbent solution 9 as shown in FIG. 6. The same conditions (i.e., temperature, immersion time, and atmosphere) are the same as described above. By this immersion procedure, as shown in FIG. 7, the trichlorosilyl group present at the end of the hydrocarbon reacts with the —OH group that is present at the end of the hydrocarbon molecule of the first monomolecular film, and the elimination of hydrogen chloride occurs. Thus, the chemical adsorbent is bound covalently to the first monomolecular film through —Si—O— linkage to form a second monomolecular film 10. Because this example uses the chemical adsorbent having a trichlorosilyl group at one molecular end, the remaining Cl groups which are linked to the Si atom are hydrolyzed into —OH groups, and then polycondensed to form siloxane linkage with the adjacent molecules (See, FIGS. 3 and 7).

Figure 8B:
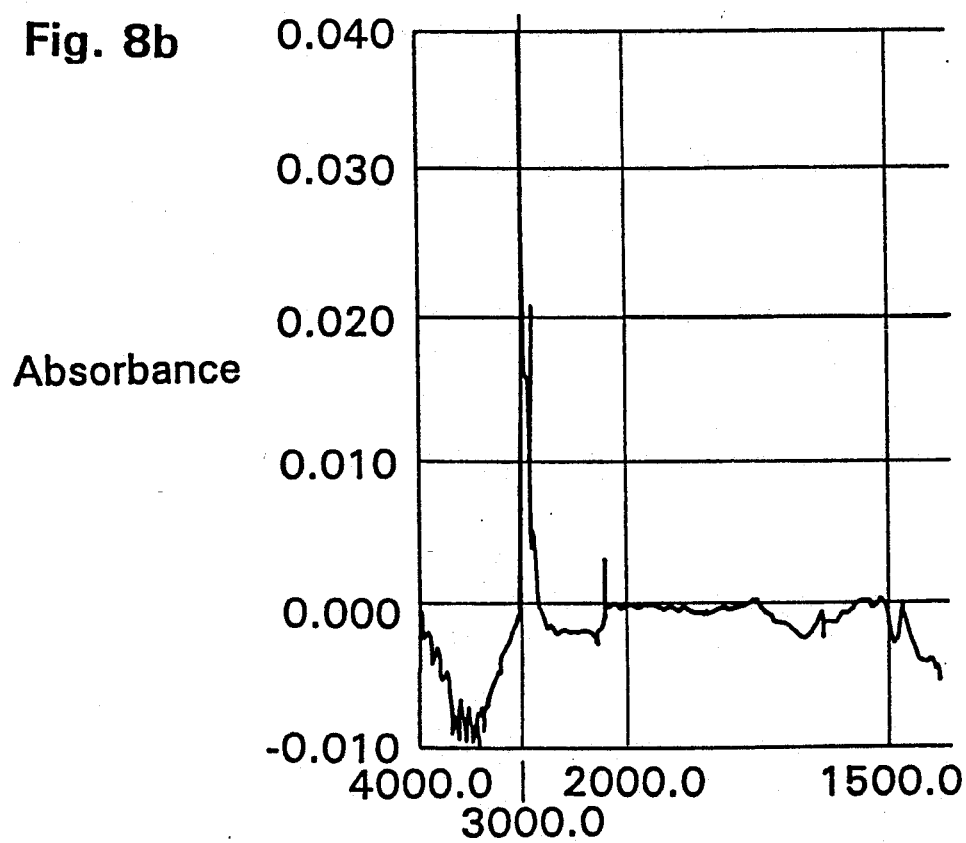
FIG. 8b shows the IR spectrum chart of a lamination of monomolecular films prepared by forming a second monomolecular film on the surface of said first monomolecular film.

FIG. 8b shows the IR spectrum chart of the resulting lamination of organic monomolecular films. As seen from FIG. 8b, the absorbance observed at 2925 cm$^{-1}$ and 2850 cm$^{-1}$ which originate from $CH_2$ antisymmetric stretching vibration, and $CH_2$ symmetric stretching vibration respectively, is twice the scale as that is shown in FIG. 8a, indicating that a lamination of organic monomolecular films made of two monomolecular films are formed on the base plate.

Example 2

A silicon base plate (30×70 mm) 11 is provided, and its surface is oxidized to form an oxidation film 12 having 0.2 μm thickness. As shown in FIG. 9, a number of —OH groups 13 are present on the surface of the silicon base plate 11 having the oxidation film 12.

Figure 16A:
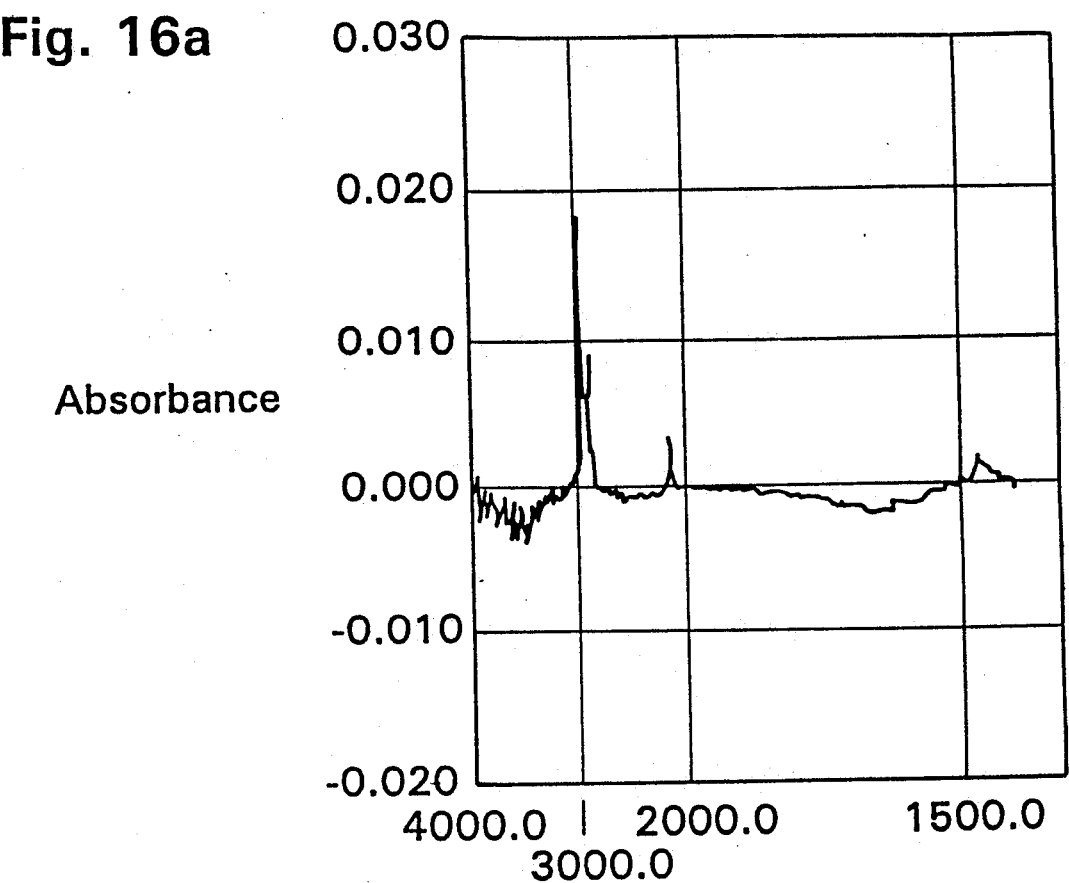
FIG. 16a shows the IR spectrum chart of a first monomolecular film formed according to the second process of this invention.

In this example, $H(CH_3)_2Si—(CH_2)_{18}—SiCl_3$ was used as a chemical adsorbent. This chemical adsorbent consists of a straight chain hydrocarbon having dimethylsilyl group at one molecular end, and trichlorosilyl group at the other end. The chemical adsorbent is dissolved into a mixed solvent containing 80 wt % of n-hexadecane, 12 wt % of chloroform, and 8 wt % of carbon tetrachloride in a concentration of 10 mmol/l. The aforementioned silicon plate is immersed in 25 ml of this solution at 30° C. for one hour (See, FIG. 10). The immersion procedure is carried out under dry nitrogen atmosphere. By this immersion procedure, as shown in FIG. 11, the trichlorosilyl group that is present at the end of the straight chain hydrocarbon reacts with the —OH group that is present on the base plate, so the elimination of hydrogen chloride occurs. Thus, the chemical adsorbent is bound covalently to the base plate by the —Si—O— linkage to form a first monomolecular film 15. On the surface of the first monomolecular film 15, dimethyl silyl groups forming ends of the hydrocarbon molecules are present on the same plane. FIG. 16a shows the infrared adsorption (IR) spectrum chart of the first monomolecular film. In the spectrum chart, the absorptions at 2925 cm$^{-1}$ and 2850 cm$^{-1}$ orginate from $CH_2$ anti-symmetric stretching vibration, and $CH_2$ symmetric stretching vibration, respectively.

Next, 1% aqueous solution of tetramethylammonium hydroxide is prepared and used as an alkali treatment solution. Instead of the aqueous solution, a methanol solution of tetramethylammonium hydroxide can also be used. The base plate having the first monomolecular film is immersed in the alkali treatment solution 17 at room temperature for 10 minutes as shown in FIG. 12. Thus, a Si—H linkage in the dimethylsilyl group which is present at the end of the hydrocarbon is cleaved to form a —Si(CH$_3$)$_2$OH group shown by numeral 18 (See, FIG. 13).

Figure 14:
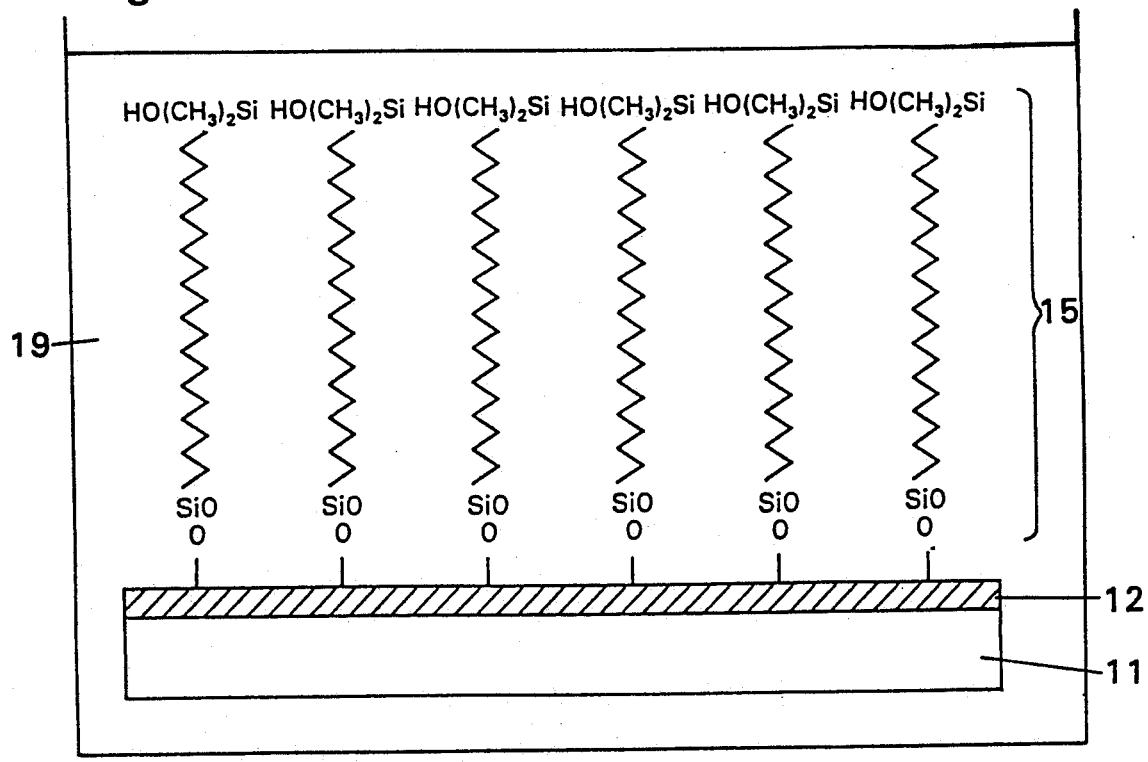

Then, the chemical adsorbent solution 19 is prepared as described above. The alkali-treated base plate having the first monomolecular film is immersed in the chemical adsorbent solution 19 as shown in FIG. 14. The same conditions (i.e., temperature, immersion time, and atmosphere) are employed as described above. By this immersion procedure, as shown in FIG. 15, the trichlorosilyl group that is present at the end of the hydrocarbon reacts with the —OH group that is present at the end of the hydrocarbon molecule of the first monomolecular film, and the elimination of hydrogen chloride occurs. Thus, the chemical adsorbent is bound covalently to the first monomolecular film through the —Si—O—Si— linkage to form a second monomolecular film 101. Because this example uses the chemical adsorbent having a trichlorosilyl group at one molecular end, the remaining Cl groups which are linked to the Si atom are hydrolyzed into —OH groups, and then polycondensed to form a siloxane linkage with adjacent molecules (See, FIGS. 11 and 15).

Figure 16B:
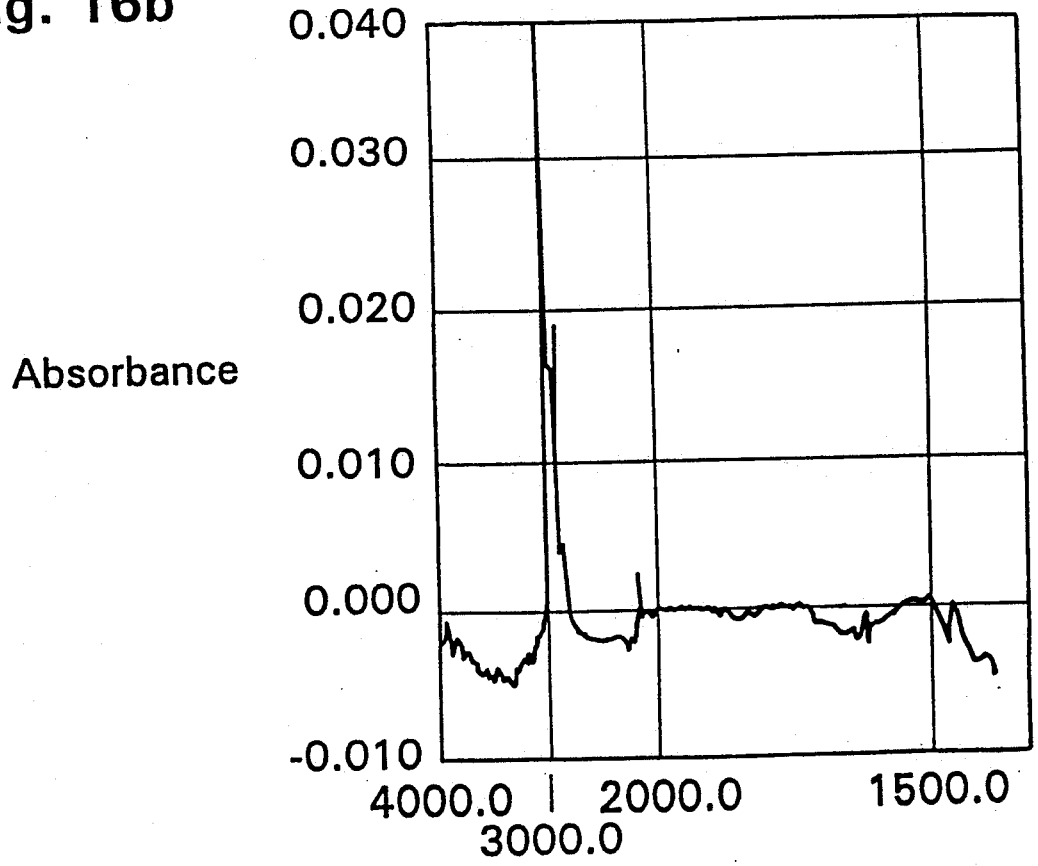
FIG. 16b shows the IR spectrum chart of a lamination monomolecular film prepared by forming a second monomolecular film on the surface of said first monomolecular film.

FIG. 16b shows the IR spectrum chart of the resulting lamination of organic monomolecular films. As seen from FIG. 16b, the absorbance observed at 2925 cm$^{-1}$ and 2850 cm$^{-1}$ which originate from CH$_2$ anti-symmetric stretching vibration, and CH$_2$ symmetric stretching vibration respectively, is twice the scale as that shown in FIG. 16a, indicating that a lamination of organic monomolecular films made of two monomolecular films are formed on the base plate.

Examples 3-10

A lamination of organic monomolecular films was prepared as in Example 1, except that the compound shown in Table 1 was used as the chemical adsorbent, and that the amounts of potassium fluoride and potassium hydrogencarbonate were as shown in Table 1.

TABLE 1

| | Chemical adsorbent | Potassium fluoride (mg) | Potassium hydrogen carbonate (mg) |
|---|---|---|---|
| Example 3 | F(CH$_3$)$_2$Si—(CH$_2$)$_{18}$—SiCl$_3$ | 147.5 | 254.8 |
| Example 4 | F$_2$(CH$_3$)Si—(CH$_2$)$_{18}$—SiCl$_3$ | 147.2 | 253.0 |
| Example 5 | Cl(CH$_3$)$_2$Si—(CH$_2$)$_{18}$—SiCl$_3$ | 147.2 | 252.7 |
| Example 6 | Cl$_2$(CH$_3$)Si—(CH$_2$)$_{18}$—SiCl$_3$ | 146.8 | 254.0 |
| Example 7 | (CH$_3$)$_2$N—Si(CH$_3$)$_2$—(CH$_2$)$_{18}$—SiCl$_3$ | 147.2 | 254.6 |
| Example 8 | CH$_3$O(CH$_3$)$_2$Si—(CH$_2$)$_{18}$—SiCl$_3$ | 146.9 | 253.0 |
| Example 9 | (CH$_3$O)$_2$(CH$_3$)Si—(CH$_2$)$_{18}$—SiCl$_3$ | 147.5 | 253.3 |
| Example 10 | C$_6$H$_5$(CH$_3$)$_2$Si—(CH$_2$)$_{18}$—SiCl$_3$ | 147.4 | 243.2 |

The IR spectrum of the obtained specimen showed that a lamination of organic monomolecular films made of two monomolecular films was formed on the base plate.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A process for preparing a lamination of organic monomolecular films comprising:

forming a first monomolecular film on a base plate by using a hydrocarbon having a group represented by the following formula I at one molecular end, and a group represented by the following formula II at the other end:

—Si—Cl$_{n1}$X$^1_{3-n1}$    (I)

wherein X$^1$ is each independently, H, a lower alkyl group having 1 to 4 carbon atoms, an alkoxy group having 1 to 4 carbon atoms, a hydrocarbon group with unsaturated bonds having 2 to 30 carbon atoms, or a group represented by the following formula V, and n$^1$ is 1, 2 or 3, X$^4_{3-n4}$Y$^2_{n4}$Si—(CH$_2$)p$^1$—Z$_r$1—(CH$_2$)q$^1$—Si—    (V)

wherein X$^4$ is a lower alkyl group having 1 to 4 carbon atoms, Y$^2$ is, each independently, H, halogen, phenyl, —NR$^3_2$, or —OR$^3$, R$^3$ is a lower alkyl group having 1 to 4 carbon atoms, Z$_r$1 is a single bond or a group selected from the group consisting of:

—CH—C≡C—
|
R$^4$ (R$^4$ is a lower alkyl group having 1 to 4 carbon atoms), —C≡C—C≡C—,

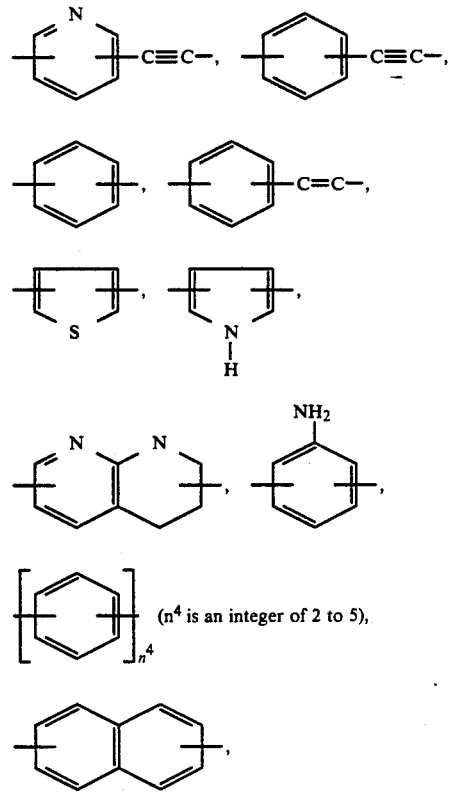

(n$^4$ is an integer of 2 to 5),

-continued

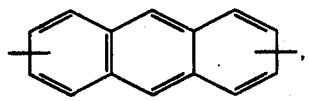

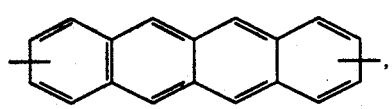

and

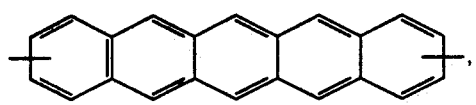

p¹ and q¹ are, each independently, zero or an integer, and p plus q is 1 to 30, and r¹ is an integer of zero to 5, $$-Si-X^2{}_{3-n^2}Y^1{}_{n^2} \quad (II)$$

wherein $X^2$ is a lower alkyl group having 1 to 4 carbon atoms, $Y^1$ is, each independently, H, halogen, phenyl, $-NR^1{}_2$, or $-OR^1$, $R^1$ is a lower alkyl group having 1 to 4 carbon atoms, and $n^2$ is 1 or 2; converting the group represented by formula II into an —OH group by oxidizing said first monomolecular film with hydrogen peroxide; and forming a second monomolecular film on the surface of said oxidized first monomolecular film by using a hydrocarbon, wherein said hydrocarbon has a group represented by said formula I at one molecular end, and a group represented by said formula II at the other end.

2. A process of claim 1, wherein said group represented by formula II is at least one selected from the group consisting of —Si(CH₃)₂H, —Si(CH₃)₂F, —Si(CH₃)F₂, —Si(CH₃)₂Cl, —Si(CH₃)Cl₂, —Si(CH₃)₂NR¹₂, —Si(CH₃)₂OR¹, —Si(CH₃)(OR¹)₂, and —Si(CH₃)₂C₆H₅.

3. A process of claim 1, wherein the step for forming said first monomolecular film is carried out by a chemical adsorption technique.

4. A process of claim 1, wherein the step for forming said second monomolecular film is carried out by a chemical adsorption technique.

5. A process of claim 1, wherein the surface of said base plate has hydroxyl groups, amino groups, or carboxyl group.

6. A process for preparing a lamination of organic monomolecular films comprising:

forming a first monomolecular film on a base plate by using a hydrocarbon having a group represented by the following formula I at one molecular end, and a group represented by the following formula III at the other end:

$$-Si-Cl_{n^1}X^1{}_{3-n^1} \quad (I)$$

wherein $X^1$ is each independently, H, a lower alkyl group having 1 to 4 carbon atoms, an alkoxy group having 1 to 4 carbon atoms, a hydrocarbon group with unsaturated bonds having 2 to 30 carbon atoms, or a group represented by the following formula V, and $n^1$ is 1, 2 or 3,

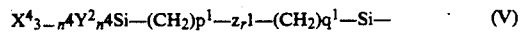

wherein $X^4$ is a lower alkyl group having 1 to 4 carbon atoms, $Y^2$ is, each independently, H, halogen, phenyl, $-NR^3{}_2$, or $-OR^3$, $R^3$ is a lower alkyl group having 1 to 4 carbon atoms, $Z_r1$ is a single bond or a group selected from the group consisting of:

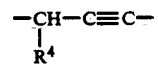

($R^4$ is a lower alkyl group having 1 to 4 carbon atoms), —C≡C—C≡C—,

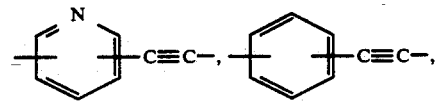

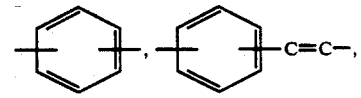

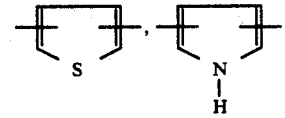

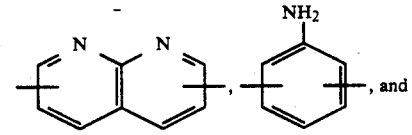

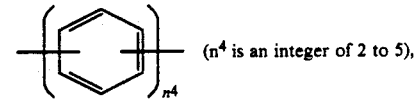

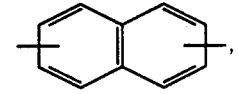

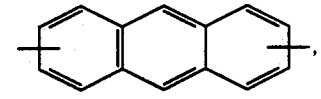 ($n^4$ is an integer of 2 to 5),

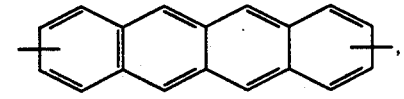

and

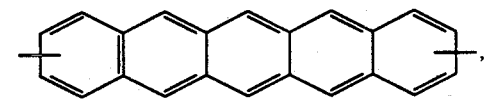

p¹ and q¹ are, each independently, zero or an integer, and p plus q is 1 to 30, and r¹ is an integer of zero to 5, $-SiX^3{}_2H$        (III)

wherein $X^3$ is a lower alkyl group having 1 to 4 carbon atoms, converting the H in the group represented by formula III into an —OH group by treating said first monomolecular film with an alkali; and forming a second monomolecular film on the surface of said alkali-treated first monomolecular film by using a hydrocarbon, wherein said hydrocarbon has a group represented by said formula I at one molecular end, and a group represented by said formula III at the other end.

7. A process of claim 6, wherein the step for forming said first monomolecular film is carried out by a chemical adsorption technique.

8. A process of claim 6, wherein the step for forming said second monomolecular film is carried out by a chemical adsorption technique.

9. A process of claim 6, wherein the surface of said base plate has hydroxyl groups, amino groups, or carboxyl groups.

10. The process of claim 6 wherein said hydrocarbon is represented by the following formula VI:

$HX^3{}_2Si-(CH_2)_p-Z_r-(CH_2)_q-SiCl_{n^1}X^1{}_{3-n^1}$      (VI)

wherein $X^1$ is each independently, H, a lower alkyl group having 1 to 4 carbon atoms, or an alkoxy group having 1 to 4 carbon atoms, $Z_r$ is a single bond or a group selected from the group consisting of:

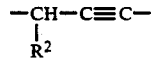

($R^2$ is a lower alkyl group having 1 to 4 carbon atoms), $-C\equiv C-C\equiv C$,

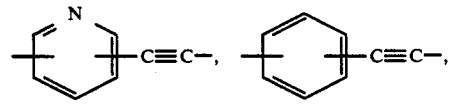

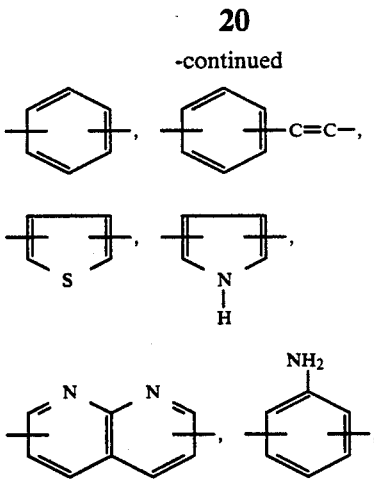

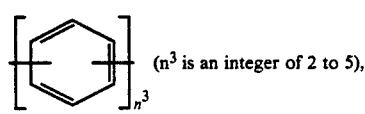

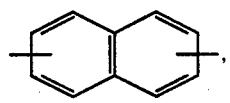 ($n^3$ is an integer of 2 to 5),

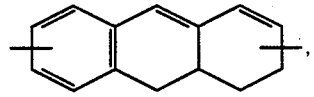

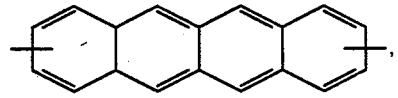

and

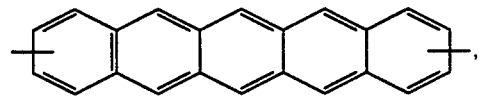

$X^3$ is a lower alkyl group having 1 to 4 carbon atoms, $n^1$ is 1, 2, or 3, p and q are, each independently, zero or an integer, and p plus q is 1 to 30, and r is an integer of zero to 5.

* * * * *

UNITED STATES PATENT AND TRADEMARK OFFICE
CERTIFICATE OF CORRECTION

PATENT NO. : 5,246,740
DATED : September 21, 1993
INVENTOR(S) : Norihisa Mino et al.

It is certified that error appears in the above-indentified patent and that said Letters Patent is hereby corrected as shown below:

Column 2, line 65, delete "$X^4{}_{3-n}4Y^2{}_n4Si-(CH_2)p^1-Z_r1-(CH_2)q^1-Si(V)-$" and insert --$X^4{}_{3-n}4Y^2{}_n4Si-(CH_2)p^1-Z_r1-(CH_2)q^1-Si-$  (V)--.

Signed and Sealed this

Nineteenth Day of April, 1994

Attest:

BRUCE LEHMAN

*Attesting Officer*    *Commissioner of Patents and Trademarks*

UNITED STATES PATENT AND TRADEMARK OFFICE
CERTIFICATE OF CORRECTION

PATENT NO. : 5,246,740
DATED : September 21, 1993
INVENTOR(S) : Norihisa Mino et al.

It is certified that error appears in the above-indentified patent and that said Letters Patent is hereby corrected as shown below:

Claim 10, column 20, line 30, delete " 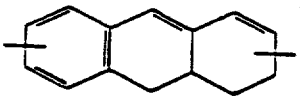 " and insert-- 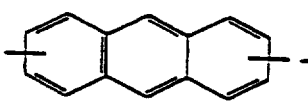 --

Claim 10, column 20, line 35 delete " 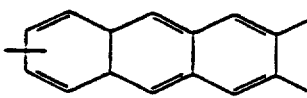 " and insert-- 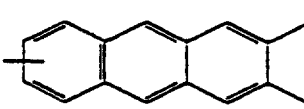 --

Signed and Sealed this

Twenty-eight Day of February, 1995

Attest:

BRUCE LEHMAN

Attesting Officer    Commissioner of Patents and Trademarks